(12) United States Patent
Horikawa

(10) Patent No.: US 11,568,325 B2
(45) Date of Patent: Jan. 31, 2023

(54) LEARNING APPARATUS, ESTIMATION APPARATUS, LEARNING METHOD, AND PROGRAM

(71) Applicant: SONY INTERACTIVE ENTERTAINMENT INC., Tokyo (JP)

(72) Inventor: Tsutomu Horikawa, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 629 days.

(21) Appl. No.: 16/606,409

(22) PCT Filed: May 16, 2017

(86) PCT No.: PCT/JP2017/018407
§ 371 (c)(1),
(2) Date: Oct. 18, 2019

(87) PCT Pub. No.: WO2018/211602
PCT Pub. Date: Nov. 22, 2018

(65) Prior Publication Data
US 2020/0118037 A1    Apr. 16, 2020

(51) Int. Cl.
*G06N 20/20*    (2019.01)
*G06K 9/62*    (2022.01)
*G06N 3/08*    (2006.01)
*G06N 20/00*    (2019.01)

(52) U.S. Cl.
CPC .......... *G06N 20/20* (2019.01); *G06K 9/6289* (2013.01); *G06N 3/08* (2013.01); *G06N 20/00* (2019.01)

(58) Field of Classification Search
USPC .......................................................... 706/12
See application file for complete search history.

(56) References Cited

PUBLICATIONS

Z. Sun, Y. Chen, J. Qi and J. Liu, "Adaptive Localization through Transfer Learning in Indoor Wi-Fi Environment," 2008 Seventh International Conference on Machine Learning and Applications, 2008, pp. 331-336, doi: 10.1109/ICMLA.2008.53. (Year: 2008).*
International Search Report and Written Opinion dated Aug. 1, 2017, from International Application No. PCT/JP2017/018407, 9 sheets.

(Continued)

*Primary Examiner* — Bryce M Aisaka
(74) *Attorney, Agent, or Firm* — Katten Muchin Rosenman LLP

(57) ABSTRACT

There are provided a learning apparatus, a learning method, and a program that enable, by using one type of device data, learning of a plurality of models using different data formats. A learning data acquiring section (36) acquires first data that is first-type device data. A first learning section (42) performs learning of a first model (34(1)) in which an estimation using the first-type device data is executed by using the first data. A learning data generating section (40) generates second data that is second-type device data the format of which differs from the format of the first-type device data on the basis of the first data. A second learning section (44) performs learning of a second model (34(2)) in which an estimation using the second-type device data is executed by using the second data.

5 Claims, 6 Drawing Sheets

(56) References Cited

PUBLICATIONS

Sun, Zhuo, Chen, Yiqiang, Qi, Juan, and Liu, Junta, Adaptive Localization through Transfer Learning in Indoor Wi-Fi Environment, Proceedings of the 2008 Seventh International Conference on Machine Learning and Applications [online], IEEE, 2008, [retrieval date Jul. 19, 2017], pp. 331-336, Internet:<URL:https://ieeexplore.ieee.org/iel5/4724937/4724938/04724994.pdf>,<DOI:10.1109/ICMLA.2008.53>, particularly, abstract, chapter 1, 1st to 2nd paragraphs, chapters 3 to 4, chapter 5, 1st to 5th paragraphs.

Cook, Dianne, Feuz, D. Kyle, Krishnan, C. Narayanan, Transfer Learning for Activity Recognition: A Survey [online], Sep. 1, 2014, [retrieval date Jul. 19, 2017], Internet: <URL:https://www.ncbi.nlm.nih.gov/pmc/articles/PMC3768027/pdf/nihms490006.pdf>, entire text.

International Preliminary Report on Patentability dated Nov. 28, 2019, from International Application No. PCT/JP2017/018407, 13 sheets.

\* cited by examiner

| DEVICE TYPE ID | FORMAT DATA |
|---|---|
| 1 | IMAGE (rgbz, 256 GRADATIONS ...), VOICE |
| 2 | IMAGE (rgb, 32 GRADATIONS ...) |

| FIRST DEVICE TYPE ID | SECOND DEVICE TYPE ID |
|---|---|
| 1 | 2 |

LEARNING APPARATUS, ESTIMATION APPARATUS, LEARNING METHOD, AND PROGRAM

TECHNICAL FIELD

The present invention relates to ca learning apparatus, an estimation apparatus, a learning method, and a program.

BACKGROUND ART

In recent years, there has been noticed a technique of an artificial intelligence for performing an estimation of an estimation target by using a machine learning model such as a neural network or a support vector machine (SVM). In the foregoing technique, for example, an estimation of an estimation target is performed on the basis of an output when data of the estimation target is input to a learnt model.

SUMMARY

Technical Problem

In recent years, data such as sensing data can be collected massively by using various devices. It is expected that when learning of a model is performed by using a large amount of data collected as described above, an estimation accuracy of an estimation target using the model is improved.

However, an estimation using a machine learning model needs to be performed by using data of a format used for learning of the model. Further, a format of acquirable data is different depending on a device type. Therefore, at present, the learning of the model corresponding to the type needs to be performed in each type of devices that collect data. Further, an estimation of an estimation target needs to be performed on the basis of an output when data of the estimation target is input to a model corresponding to the data. As described above, at present, even if a large amount of data of various types can be collected by using various devices, only a part of the collected data can be used for learning of one model.

The present invention has been made in view of the above circumstances. An object of the present invention is therefore to provide a learning apparatus, an estimation apparatus, a learning method, and a program that enable, with use of one type of device data, learning of a plurality of models using different data formats.

Solution to Problem

To solve the above problem, a learning apparatus according to the present invention includes an acquiring section that acquires first data that is first-type device data, a first learning section that performs learning of a first model in which an estimation using the first-type device data is executed by using the first data, a generating section that generates second data that is second-type device data a format of which differs from a format of the first-type device data on the basis of the first data, and a second learning section that performs learning of a second model in which an estimation using the second-type device data is executed by using the second data.

According to one aspect of the present invention, the generating section converts the first data from a dimension of the first-type device data into a dimension of the second-type device data and thereby generates the second data.

Further, according to one aspect of the present invention, the generating section reduces a granularity of the first data to a granularity of the second-type device data and thereby generates the second data.

Further, according to one aspect of the present invention, the generating section selects a part corresponding to the format of the second-type device data from the first data and thereby generates the second data.

Further, an estimation apparatus according to the present invention includes an input section that inputs data of an estimation target that is second-type device data to a learnt model in which learning is executed by learning data that is the second-type device data that is data generated on the basis of first-type device data and a format of which differs from a format of the first-type device data, and an estimation processing executing section that executes an estimation process of the estimation target on the basis of an output of the learnt model in accordance with an input of the data of the estimation target.

Further, a learning method according to the present invention includes a step of acquiring first data that is first-type device data, a step of performing learning of a first model in which an estimation using the first-type device data is executed by using the first data, a step of generating second data that is second-type device data a format of which differs from a format of the first-type device data on the basis of the first data, and a step of performing learning of a second model in which an estimation using the second-type device data is executed by using the second data.

Further, a program according to the present invention causes a computer to execute a procedure for acquiring first data that is first-type device data, a procedure for performing learning of a first model in which an estimation using the first-type device data is executed by using the first data, a procedure for generating second data that is second-type device data a format of which differs from a format of the first-type device data on the basis of the first data, and a procedure for performing learning of a second model in which an estimation using the second-type device data is executed by using the second data.

DESCRIPTION OF EMBODIMENT

Hereinafter, one embodiment of the present invention will be described in detail with reference to the appended drawings.

Figure 1:
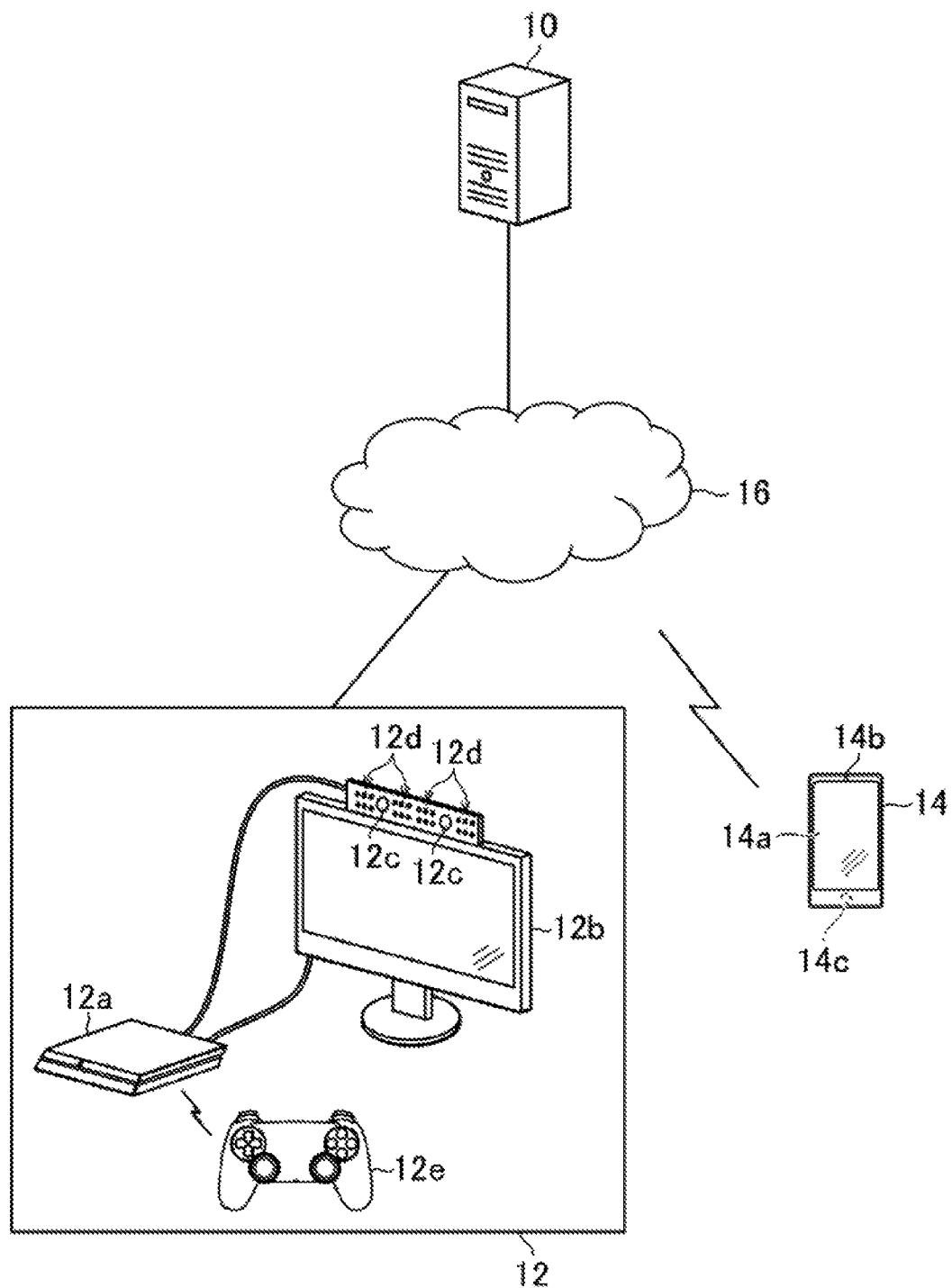
FIG. 1 is a diagram illustrating one example of the entire configuration of a computer network according to one embodiment of the present invention.

FIG. 1 is the entire configuration diagram illustrating a computer network according to one embodiment of the present invention. As illustrated in FIG. 1, a server 10, an entertainment system 12, and a smartphone 14 each of which mainly includes a computer are connected to a computer network 16 such as the Internet. Further, the entertainment system 12 and the smartphone 14 are capable of communicating with the server 10 through the computer network 16.

Figure 2:
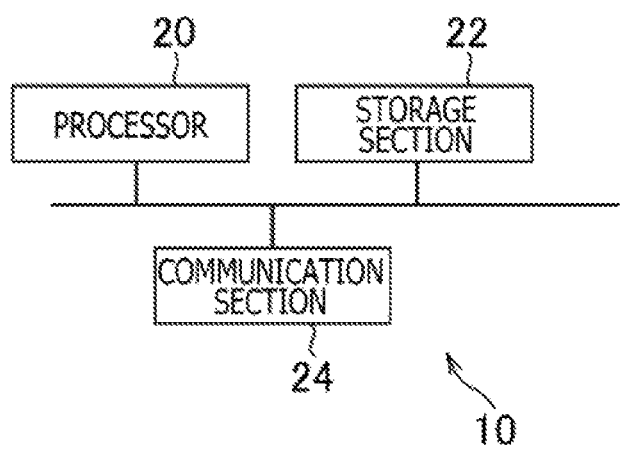
FIG. 2 is a diagram illustrating one example of a configuration of a server according to one embodiment of the present invention.

The server 10 is a computer system functioning as a learning apparatus and an estimation apparatus according to one embodiment of the present invention. FIG. 2 is a configuration diagram illustrating the server 10 according to one embodiment of the present invention. As illustrated in FIG. 2, the server 10 according to the present embodiment includes a processor 20, a storage section 22, and a communication section 24, for example. The processor 20 is a program control device such as a central processing nit (CPU) that operates in accordance with programs installed in the server 10, for example. The storage section 22 is a storage device such as a read-only memory (ROM) or a random access memory (RAM), a hard disk drive, or the like. A program and the like executed by the processor 20 are stored in the storage section 22. The communication section. 24 is a communication interface such as a network board.

The entertainment system 12 according to the present embodiment includes an entertainment apparatus 12a, a display 12b, cameras 12c, microphones 12d, a controller 12e, and the like. The entertainment apparatus 12a is a computer such as a game console. The display 12b is a liquid crystal display or the like, for example, and displays videos etc. represented by a video signal output by the entertainment apparatus 12a. The camera 12c is a device such as a digital camera that outputs data indicating appearances around the camera 12c, such as an image obtained by capturing a photographic object to the entertainment apparatus 12a. Further, the camera 12c according to the present embodiment may be a stereoscopic camera capable of photographing a color image associated with depth information. For example, the camera 12c may be capable of photographing a color image including a d value indicating a distance from the camera 12c up to a photographic object in addition to a R value, a G value, and a B value in each pixel. The microphone 12d is a device that acquires ambient voices and outputs voice data indicating the voices to the entertainment apparatus 12a. The controller 12e is an operation input apparatus that performs an operation input on the entertainment apparatus 12a.

The smartphone 14 according to the present embodiment is a portable computer including a touch panel 14a, a camera 14b, a microphone 14c, and the like, for example. Here, in the present embodiment, the camera 14b is assumed to be not a stereoscopic camera. Therefore, the camera 14b is assumed to be incapable of photographing a color image associated with the depth information.

Figure 3:
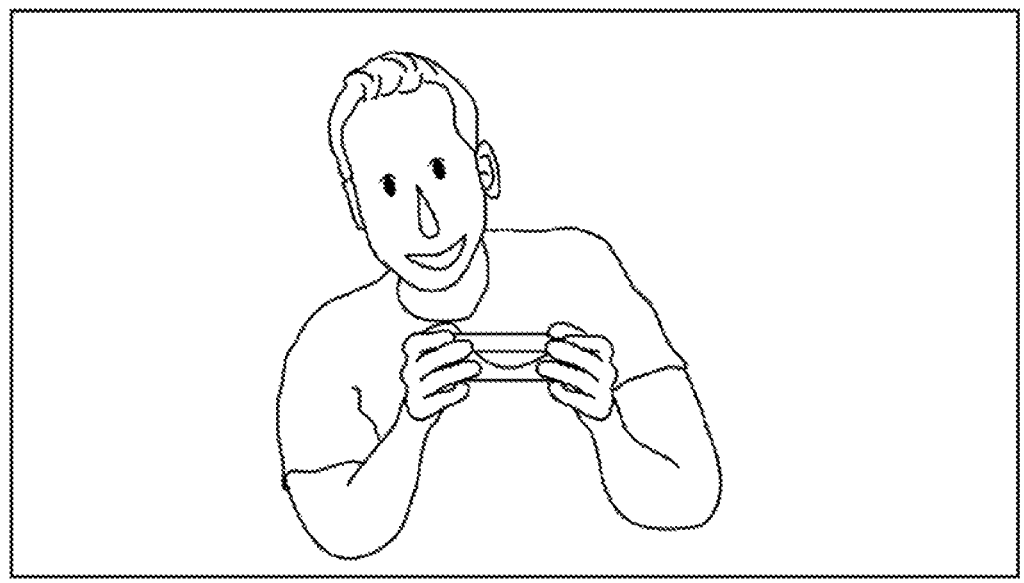
FIG. 3 is a diagram illustrating one example of an image photographed by cameras of an entertainment system.

A machine learning model is stored in the server 10 according to the present embodiment. By using, as input data, an image of a face of a user exemplified in FIG. 3, which is photographed by the cameras 12c, and voice data indicating voices acquired by the microphones 12d, and by using, as teacher data, a user identification (ID) of the user, the model executes supervised learning. Here, the image is assumed to be the color image associated with the depth information as described above. In this case, for example, the user ID input by the user when logging in to the entertainment system 12, the image photographed by the cameras 12c on this occasion, and the voice, data indicating voices acquired by the microphones 12d on this occasion may be transmitted to the server 10. It is noted that the user ID, image, and voice data described above may be transmitted to the server 10 via a communication section such as a communication interface included in the entertainment apparatus 12a. Further, the supervised learning may be executed by using, as the input data, the image and voice data transmitted as described above and by using, as the teacher data, the transmitted user ID.

when the above learning is executed many times, the user ID of the user is capable of being estimated on the basis of images of the face of the user photographed by the cameras 12c and the voice data indicated by the voice acquired by the microphones 12d by using the model in which learning is executed, for example. Under the above circumstances, it is unnecessary for the user to input the user ID, for example. The images of the face of the user are photographed by using the cameras 12c and thereby the user is able to leg in to the entertainment system 12.

Further, in the server 10 according to the present embodiment, even a model using, as the input data, an image photographed by the camera 14b included in the smartphone 14 is stored in addition to a model using, as the input data, the image and voice data transmitted by the entertainment system 12. Hereinafter, the model using, as the input data, the image and voice data transmitted by the entertainment system 12 is to be referred to as a first model. Further, a model using, as the input data, the image photographed by the camera 14b included in the smartphone 14 is to be referred to as a second model.

In the present embodiment, when the first model is learnt using, as the input data, the image and voice data transmitted by the entertainment system 12, an image having the same format as that of the image photographed by the camera 14b included in the smartphone 14 is generated on the basis of the image. In the present embodiment, when the first model is learnt, for example, learning of the second model using, as the input data, the image generated as described above is collectively performed.

Here, for example, the image photographed by the camera 14b is assumed to be smaller than the image photographed by the cameras 12c in the number of pixels included in one image. Further, the image photographed by the camera 14b is assumed to differ from the image photographed by the cameras 12c in aspect ratio. Further, the image photographed by the camera 14b is assumed to be smaller than the image photographed by the cameras 12c even in gradation level of each pixel. Specifically, for example, the image photographed by the cameras 12c is assumed to have 256 gradation levels and the image photographed by the camera 14b is assumed to have 32 gradation levels. In this case, in the present embodiment, for example, various processes are executed on the image photographed by the cameras 12c. Here, examples of the process include a process of deleting the d value of each pixel, a process of making the number of pixels included in one image smaller, a trimming process, a padding process, an extension process, a reduction process, a deformation process, a process of reducing a gradation level of each pixel, and the like. Then, there is performed the learning of the second model using, as the input data, an image after the above processes are executed.

Note that, in the learning of the second model, the teacher data used for the learning of the first model may be diverted. By using, as the teacher data, the user ID received from the entertainment system 12 by the server 10 along with the image and by using, as the input data, an image in which the above-described process is executed on an image received by the server 10, for example, the learning of the second model may be executed.

Figure 4:
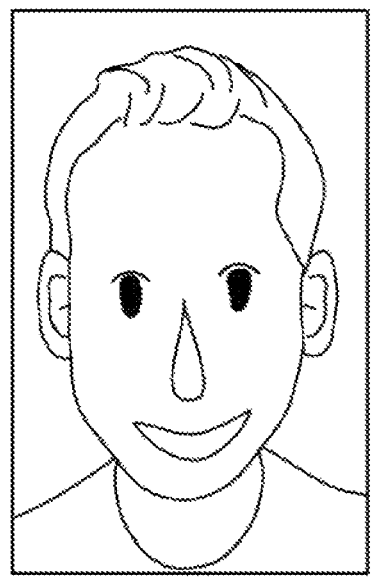
FIG. 4 is a diagram illustrating one example of an image photographed by a camera of a smartphone.
Figure 5:
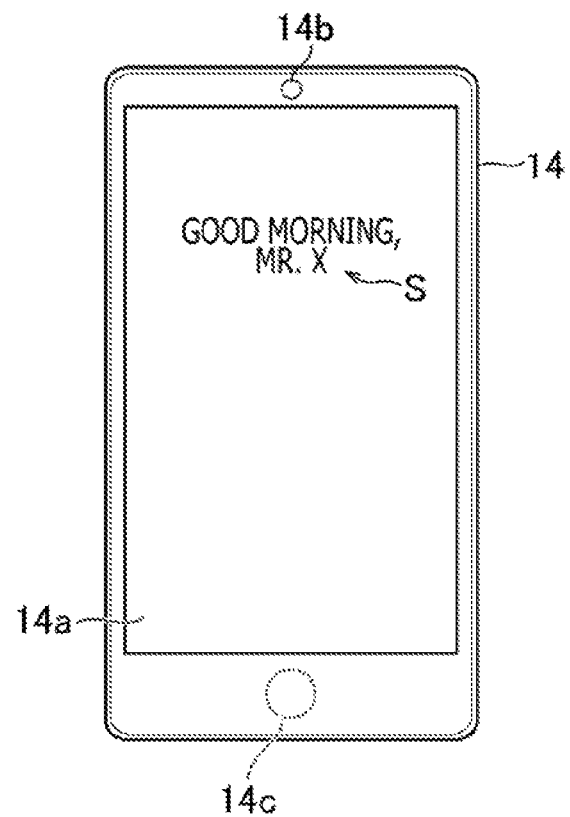
FIG. 5 is a diagram illustrating one example of an appearance in which character strings representing a name of a user are displayed on a touch panel of the smartphone.

In the present embodiment, on the basis of an output when an image of the user photographed by the camera 14b of the smartphone 14, which is exemplified in FIG. 4, is input to the second model in which the learning is executed as described above, an estimation of the user ID of the user is executed. Here, for example, on the basis of an output when the image of the face of the user photographed by the camera 14b of the smartphone 14 is input to the second model in which the learning is executed as described above, a recognition process in the image of the face of the user may be executed. Further, on the basis of results of the recognition process, the user ID of the user may be estimated. Further, for example, user data in which the user ID of the user and a name of the user are associated with each other may be stored in the server 10. Further, the name that is associated with the user ID estimated in the user data may be specified. Further, as illustrated in FIG. 5, character strings S representing the specified name of the user may be displayed on the touch panel 14a of the smartphone 14.

Note that, in the above examples, on the basis of the image photographed by the camera 14b and the voice data representing voices acquired by the microphone 14c, an estimation of the user ID using the second model may be performed. In this case, when the learning of the second model is performed, there may be executed the learning using, as the input data, an image in which the process is executed on the image photographed by the cameras 12c and the voice data output by the microphones 12d. Alternatively, in this case, there, may be executed the learning using, as the input data, the voice data in which the process is executed on the voice data in place of the voice data output by the microphones 12d.

In recent years, various devices capable of outputting data used for an estimation are present, which are not limited to the cameras 12c of the entertainment system 12 or the camera 14b of the smartphone 14 described above. Examples of the above devices include a portable game apparatus, a head mounted display (HMD), a tablet terminal, a digital camera, a personal computer, and the like. In addition, even a vehicle such as an automobile, an airplane, or a drone is considered as one example of the above devices.

Although not limited to the camera or the microphone, some sensors capable of detecting various physical amounts and outputting sensing data corresponding to the physical amounts, which are included in the above-described various devices, are present. For example, a motion sensor capable of detecting a velocity, an angular velocity, an acceleration, an angular acceleration, and the like at which a device moves, an azimuth sensor (compass) capable of detecting a direction in which a device directs, and the like are, present. Further, a global positioning system (GPS) and a wireless local area network (LAN) module each capable of detecting a position of a device, and the like are present. In addition, a temperature sensor capable of detecting a temperature, a humidity sensor capable of detecting a humidity, and the like are present.

Further, some, cameras capable of outputting a gray scale image, a binary image, and the like or outputting a moving image (video) are present.

Further, in the above-described various devices, a device including a clock capable of outputting data indicating a present time, or a device capable of outputting identification information of the user such as a user ID, a name, an age, a sex, and an address of the user who uses the device is also present.

Further, data used for the learning or estimation in the present invention is not limited to the image photographed by the cameras 12c or the camera 14b or the voice data output by the microphones 12d. The present invention is applicable also to the learning or estimation using the above-described various pieces of data, for example.

Hereinafter, functions of the server 10 according to the present embodiment and processes executed by the server 10 will be further described.

Figures 6, 7:
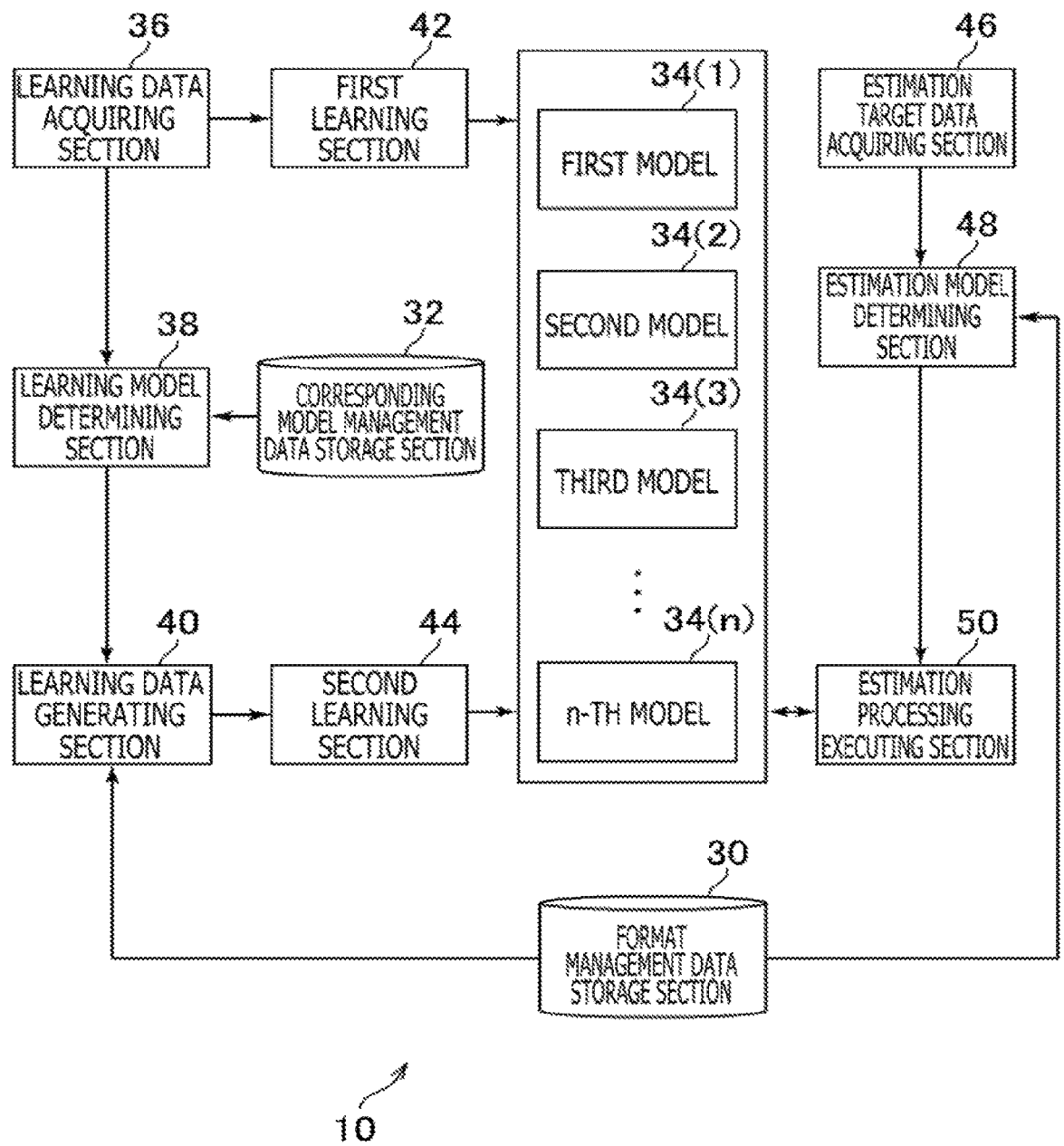
FIG. 6 is a functional block diagram illustrating one example of functions implemented by the server according to one embodiment of the present invention.
FIG. 7 is a diagram illustrating one example of format management data.

FIG. 6 is a functional block diagram illustrating one example of functions implemented by the server 10 according to the present embodiment. Note that, in the server 10 according to the present embodiment, all of the functions illustrated in FIG. 6 are not necessarily implemented, or functions other than the functions illustrated in FIG. 6 may be implemented.

As illustrated in FIG. 6, for example, the server 10 functionally includes a format management data storage section 30, a corresponding model management data storage section 32, a plurality of models 34 (a first model 34(1), a second model 34(2), a third model 34(3), . . . , a n-th model 34(n)), a learning data acquiring section 36, a learning model determining section 38, a learning data generating section 40, a first learning section 42, a second learning section 44, an estimation target data acquiring section 46, an estimation model determining section 48, and an estimation processing executing section 50. The format management data storage section 30 and the corresponding model management data storage section 32 are mainly implemented by the storage section 22. The other sections are mainly implemented by the processor 20 and the storage section 22. The server 10 according to the present embodiment plays the role of a learning apparatus that executes the learning of the model and further plays the role of an estimation apparatus that executes an estimation of an estimation target.

A program including commands corresponding to the above functions, which is installed in the server 10 that is a computer, may be executed by using the processor 20 to thereby implement the above functions. The program may be supplied to the server 10 via a computer readable information storage medium such as an optical disk, a magnetic disk, a magnetic tape, a magneto optical disk, or a flash memory, or through the Internet or the like.

In the present embodiment, for example, the format management data storage section 30 stores format management data exemplified in FIG. 7. Examples of the format management data include a device type ID that is identification information of types of the devices and format data indicating a format of the input data used for the learning and the estimation. In an example illustrated in FIG. 7, it is assumed that the device type ID of the entertainment system 12 is 1 and the device type ID of the smartphone 14 is 2. As described above, a system such as the entertainment system 12 composed of a plurality of devices may be associated with the device type ID of 1.

Further, in the present embodiment, the device type, identified by the device type ID is assumed to be associated with the model 34. Here, for example, the entertainment system 12 is assumed to be associated with the first model 34(1) and the smartphone 14 is assumed to be associated with the second model 34(2).

Figures 8, 9:
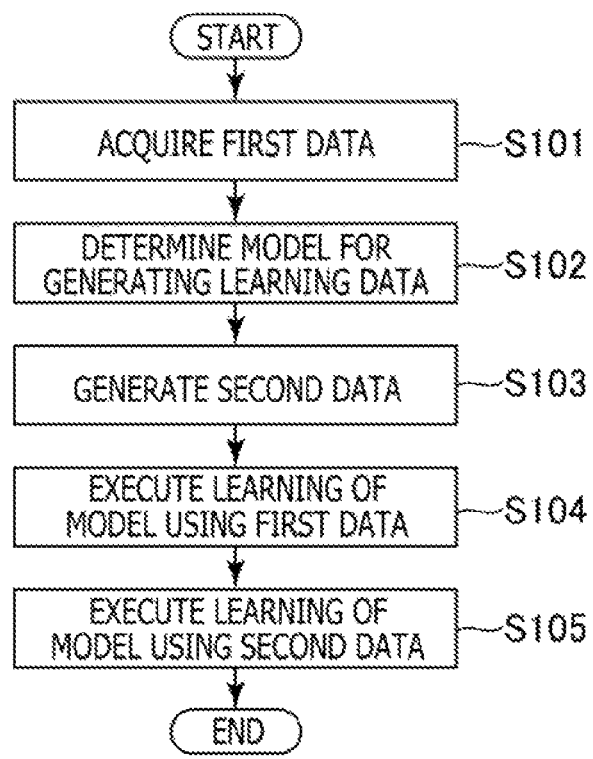
FIG. 8 is a diagram illustrating one example of corresponding model management data.
FIG. 9 is a flow diagram illustrating one example of a flow of processes performed by the server according to one embodiment of the present invention.

In the present embodiment, for example, the corresponding model management data storage section 32 stores corresponding model management data exemplified in FIG. 8. As illustrated in FIG. 8, examples of the corresponding model management data include a first device type ID that is the device, type ID of a first-type device and a second device type ID that is the device type ID of a second-type device. As the second device type ID associated with the first device type ID, for example, the device type ID associated with a model capable of generating data used for the learning is set on the basis of device data of a type identified by the first device type ID. Data used for the learning of the second model 34(2) is capable of being generated on the basis of an image acquired by the entertainment system 12 as described above. In this case, as illustrated in FIG. 8, the corresponding model management data including 1 as the first device type ID and 2 as the second device type ID is stored in the corresponding model management data storage section 32. In this case, the first-type device corresponds to the entertainment system 12 and the second-type device corresponds to the smartphone 14. Note, that the corresponding model management data may be generated on the basis of the format management data.

In the present embodiment, for example, the model 34 is the machine learning model for executing the learning and estimation using data of a format indicated by the format data included in the format management data including the device type ID associated with the model 34. As described above, the first model 34(1) is assumed to be the machine learning model for executing the learning and estimation using data of the entertainment system 12. Further, the second model 34(2) is assumed to be the machine learning model for executing the learning and estimation using data of the smartphone 14.

Note that a type of the model 34 according to the present embodiment does not particularly matter. For example, the model 34 may be a model for a support vector machine (SVM), a neural network, or other machine learning. Further, the model 33 may be a model of the supervised learning or a model of unsupervised learning.

In the present embodiment, for example, the learning data acquiring section 36 acquires learning data used to learn the model 33. In the above-described example, the learning data acquiring section 36 acquires, as the learning data, data of the entertainment system 12, which includes, as the input data, the image photographed by the cameras 12c and the voice data indicating voices acquired by the microphones 12d and includes, as the teacher data, the user ID.

In the present embodiment, for example, the learning model determining section 38 determines a model for generating the learning data on the basis of data acquired by the learning data acquiring section 36. Here, the learning model determining section 38 may determine the model for generating the learning data on the basis of the corresponding model management data stored in the corresponding model management data storage section 32. For example, the learning data acquiring section 36 is assumed to acquire first-type device data. In this case, there may be specified the second device type ID included in the corresponding model management data including the device type ID of the first type device as the first device type ID. Further, the model 34 corresponding to the second-type, device identified by the second device type ID may be determined as the model for generating the learning data. As described above, for example, in a case in which the learning data acquiring section 36 acquires the data of the entertainment system 12, the second model 34(2) may be, determined as the model for generating the learning data.

In the present embodiment, for example, the learn ng data generating section 40 generates the learning data used to learn the model 34. Here, for example, the learning data of the model 34 determined by the learning model determining section 38 a format of which differs from a format of the learning data may be generated on the basis of the learning data acquired by the learning data acquiring section 36. Further, for example, there may be generated the learning data of a format corresponding to the model 34 determined by the learning model determining section 38, which is specified on the basis of the format management data stored in the format management data storage section 30. Further, for example, the learning data of the smartphone 14 may be generated on the basis of the learning data of the entertainment system 12. Hereinafter, the first-type device data, which is acquired by the learning data acquiring section 36, is to be referred to as the first data. Further, the second-type device data a format of which differs from a format of the first-type device data, which is generated by the learning data generating section 40 on the basis of the first data, is to be referred to as the second data.

Here, for example, the learning data generating section 40 may execute a conversion process for converting the first data from a dimension of the first-type device data into a dimension of the second-type device data to thereby generate the second data. Examples of the conversion process include a process for deleting the d value of each pixel described above, specifically, a process for deleting the d value from among an R value, a G value, a B value, and the d value and selecting the R value, the G value, and the B value, and the like in each pixel included in an image. In addition, the conversion process includes a process for making the number of pixels included in one image smaller by using a compression process or the like. Further, for example, the conversion process also includes a process for selecting a frame image that is a still image from among moving images composed of a plurality of frame images. Further, for example, the conversion process includes a change process of a color space like a process for converting a color image including the R value, the G value, and the B value into a gray scale or a binary image.

Further, for example, the learning data generating section 40 may execute a granularity reduction process for reducing a granularity of the first data to a granularity of the second-type device data to thereby generate the second data. Examples of the granularity reduction process include a process for reducing a gradation level of each pixel, for example, a process for converting an image of 256 gradation levels into that of 32 gradation levels, a process for converting the gray scale image into the binary image, and the like. In addition, the granularity reduction process includes a process for converting information regarding years of the user into information regarding an age thereof (for example, a process for converting information "24 years old" into information "twenties") and a process for deleting information regarding cities, towns, and villages from positional information including prefectures, cities, towns, and villages.

Further, for example, the learning data generating section 40 may execute a selection process for selecting a part corresponding to a format of the second-type, device data from the first data to thereby generate the second data. Examples of the selection process include a process for deleting voice data and selecting an image from among the image photographed by the cameras 12c and the voice data output by the microphones 12d, and the like.

Note that the learning data generating section 40 may execute a process of an image such as a trimming process, a padding process, and a deformation process on the first data to thereby generate the second data. Further, the learning data generating section 40 may execute a plurality of processes from among the processes described above. For example, the learning data generating section 40 may reduce gradation levels for an image that is the first data and simultaneously make the number of pixels included in one, image smaller to thereby generate an image that is the second data.

In the present embodiment, for example, the first learning section 42 executes learning of the model 34 using the first-type device data. Here, for example, the learning of the first model 30 may be executed by using the data of the entertainment system 12 acquired by the learning data acquiring section 36.

In the present embodiment, for example, the second learning section 44 executes the learning of the model 34 using the second-type device data. Here, for example, the learning of the model 34 may be executed by using the data generated by the learning data generating section 40. In addition, the learning of the model 34 determined by the learning model determining section 38 may be executed. As described above, in a case in which the data of the smartphone 14 is generated on the basis of the data of the entertainment system 12, for example, the second learning section 44 executes the learning of the second model 34(2) using the generated data of the smartphone 14.

In the present embodiment, for example, the estimation target data acquiring section 46 acquires data of an estimation target input to a learnt model, in the above-described example, an image exemplified in FIG. 4, which is photographed by the camera 14b included in the smartphone 14, corresponds to the data of the estimation target. Here, for example, the device type ID corresponding to a type of a device that generates the data may be associated with the data of the estimation target. Further, for example, the format data for indicating a format of the data may be associated with the data of the estimation target.

In the present embodiment, for example, the estimation model determining section 48 determines the model 34 for executing the estimation process using the data on the basis of the data of the estimation target acquired by the estimation target data acquiring section 46. Here, for example, the model 34 associated with the device type ID associated with the data of the estimation target may be determined as the model 34 for executing the estimation process using the data of the estimation target. Further, for example, there may be specified the format management data including format data having the same value as that of the format data associated with the data of the estimation target. Further, the model 34 associated with the device type ID included in the format management data may be determined as the model 34 for executing the estimation process using the data of the estimation target.

In the present embodiment, for example, the estimation processing executing section 50 executes the estimation process of the estimation target using the data of the estimation target acquired by the estimation target data acquiring section 46. For example, the estimation processing executing section 50 may input the data of the estimation target that is the image exemplified in FIG. 4, which is photographed by the camera 14b included in the smartphone 14, to the second model 34(2) that is the learnt model. The estimation processing executing section. 50 may execute the estimation process of the estimation target such as recognition of the estimation target on the basis of an output of the second model 34(2) that is the learnt model in accordance with an input of the data of the estimation target.

For example, the estimation target data acquiring section 46 is assumed to acquire the image photographed by the camera 14b included in the smartphone 14. In this case, the estimation model determining section 48 may determine the second model 34(2) as a model for executing the estimation. Further, the estimation processing executing section 50 may, execute the estimation process of the user ID of the user represented by the image on the basis of an output from the second model 34(2) when an image acquired by the estimation target data acquiring section 46 is input to the second model 34(2). Further, for example, the estimation processing executing section 50 may execute recognition (for example, recognition etc. of the face of the user represented by the image) of the image on the basis of the output from the second model 34(2) when an image acquired by the estimation target data acquiring section 46 is input to the second model 34(2).

Note that the estimation model determining section 48 may specify the format management data including the format data indicating a format of generable data from data of a format indicated by the format data associated with the data of the estimation target. Then, the model 34 associated with the device type, ID included in the format management data may be determined as the model 34 for executing the estimation process using the data of the estimation target. In this case, the estimation processing executing section 50 may generate data of the device associated with the determined model 34 on the basis of the data acquired by the estimation target data acquiring section 46. Further, the estimation processing executing section 50 may perform an estimation of the estimation target on the basis of an output from the model 34 in accordance with an input to the model 34 determined by the generated data.

Note that the estimation executed by the estimation processing executing section 50 according to the present embodiment is not limited to the estimation of the user ID. For example, the estimation processing executing section 50 may execute semantic segmentation for specifying a meaning of the pixel such as an object indicated by the pixel in units of pixels included in an input image actually photographed. Further, for example, the estimation processing executing section 50 may execute a process for specifying what image the input image actually photographed is, a process for specifying where and what is arranged in the input image actually photographed, or the like.

Here, one example of a flow of the learning process of the model 34 performed by the server 10 according to the present embodiment will be described with reference to a flow diagram exemplified in FIG. 9.

First, the learning data acquiring section 36 acquires the first data that is the first-type device data (S101). Here, for example, the learning data including, as the input data, the image of the user photographed by the cameras 12c and the voice data indicating voices acquired by the microphones 12d and including, as the teacher data, the user ID of the user is acquired as the first data.

Then, the learning model determining section 38 determines the model 34 for generating the learning data on the basis of the first data acquired in the process illustrated in S101 (S102). Here, for example, the second model 34(2) is determined as the model 34 for generating the learning data on the basis of the first data acquired in the process illustrated in S101.

Then, the learning data generating section 40 generates the second data of the second type device associated with the second model 34(2) determined in the process illustrated in S102 on the basis of the first data acquired in the process illustrated in S101 (S103). Here, for example, an image having the same format as that of the image photographed by the camera 14b as described above is generated as the second data. Note that the plurality of models 34 may be determined in the process illustrated in S102 and the second data associated with each of the plurality of models 34 in the process illustrated in S103 may be generated.

Then, the first learning section. 42 executes the learning the model 34 associated with the first data by using the first data acquired in the process illustrated in S101 (S104). Here, for example, learning of the first model 34(1) is executed.

Then, the second learning section 44 executes the learning of the model 34 associated with the second data by using the second data generated in the process illustrated in S103 (S105). Here, for example, the learning of the second model 34(2) is, executed by using the learning data including, as the teacher data, the user ID included in the learning data acquired in the process illustrated in S101 and including, as the input data, the image generated in the process illustrated in S103. Note that in a case in which a plurality of models 34 are determined in the process illustrated in S102, the learning of the model 34 may be executed by using the second data corresponding to the model 34 in each of the plurality of models 34 in the process illustrated in S105. Then, the processes illustrated in this processing example end.

In this processing example as described above, the teacher data in the learning of the first model 34(1) is used also as the teacher data in the learning of the second model 34(2).

Figure 10:
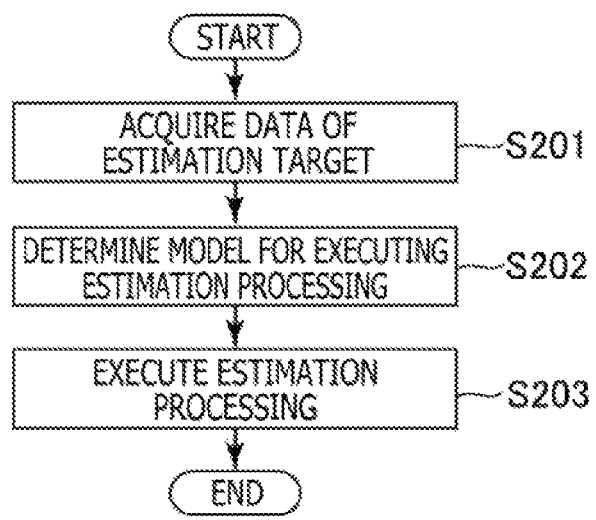
FIG. 10 is a flow diagram illustrating one example of a flow of the processes performed by the server according to one embodiment of the present invention.

Next, one example of a flow of the estimation process of the user ID based on the image photographed by the camera 14b of the smartphone 14, which is performed by the server 10 according to the present embodiment, will be described with reference to a flow diagram exemplified in FIG. 10.

First, the estimation target data acquiring section 46 acquires the image photographed by the camera 14b as the data of the estimation target (S201). The image corresponds to the second-type device data described above.

Then, the estimation model determining section 48 determines a model for executing the estimation process using the image on the basis of the image acquired in the process illustrated in S201 (S202). Here, for example, the second model 34(2) is determined as the model for executing the estimation process.

Then, the estimation processing executing section 50 executes the estimation process of the estimation target on the basis of the output of the model 34 when the data acquired in the process illustrated in S201 is input to the model 34 determined in the process illustrated in S202 (S203). Here, for example, the estimation of the user ID of the user represented by the image is executed on the basis of the output of the model 34 when the image acquired in the process illustrated in S201 is input to the model 34 determined in the process illustrated in S202. Then, the processes illustrated in the processing example end.

For example, the server 10 may generate a message including a name of a user associated with the user ID as illustrated in FIG. 4 on the basis of the user ID estimated in the process illustrated in S203. Further, the server 10 may transmit the message to the smartphone 14 that photographs the image acquired in the process illustrated in S201. Then, the smartphone 14 that receives the message may cause the message to be displayed on the touch panel 14a.

As described above, according to the present embodiment, the learning of a plurality of models 34 in which a format of the used data differs can be performed by using one type of device data. Specifically, for example, the learning of the first model 34(1) and the second model 34(2) can be performed by using the data of the entertainment system 12.

Note that the present invention is not limited to the above-described embodiment.

For example, the model 34 is not necessarily associated with the device on the one-to-one basis. For example, a plurality of devices may be used for learning and estimation of one model 34 to which data is common.

Further, specific character strings or values described above and specific character strings or values in drawings are illustrative and not limited to the character strings or values.

The invention claimed is:

1. A learning apparatus comprising:
an acquiring section configured to acquire first data that is first-type device data;
a first learning section configured to perform learning of a first model in which an estimation using the first-type device data is executed by using the first data;
a model determining section configured to determine a second model from among a plurality of models using different data formats each used for an execution of an estimation on a basis of the first type;
a generating section configured to generate second data that is second-type device data, the format of which differs from the format of the first-type device data, which is used for an execution of an estimation in the second model determined by the model determining section, on a basis of the first data; and
a second learning section configured to perform learning of the second model determined by the model determining section by using the second data,
wherein the generating section reduces a granularity of the first data to a granularity of the second-type device data and thereby generates the second data.

2. An estimation apparatus comprising:
an input section configured to input data of an estimation target that is second-type device data to a learnt model determined on a basis of a first type device data from among a plurality of models using different data formats each used for an execution of an estimation, which is a model in which learning is executed by learning data that is the second-type device data that is data generated on a basis of the first-type device data and the format of which differs from the format of the first-type device data; and
an estimation processing executing section configured to execute the estimation process of the estimation target on a basis of an output of the learnt model in accordance with an input of the data of the estimation target,
wherein the second-type device data is generated by reducing a granularity of the first-type device data.

3. A learning method comprising:
acquiring first data that is first-type device data;
performing learning of a first model in which an estimation using the first-type device data is executed by using the first data;

determining a second model from among a plurality of models using different data formats each used for an execution of an estimation on a basis of the first type;

generating second data by reducing a granularity of the first data to a granularity of the second-type device data and thereby generates the second data that is second-type device data, the format of which differs from the format of the first-type device data, which is used for an execution of an estimation in the second model determined in the determining, on a basis of the first data; and performing learning of the second model determined in the determining by using the second data.

4. A non-transitory computer readable medium having stored thereon a program for a computer, comprising:
by an acquiring section, acquiring first data that is first-type device data;
by a first learning section, performing learning of a first model in which an estimation using the first-type device data is executed by using the first data;
by a model determining section, determining a second model from among a plurality of models using different data formats each used for an execution of an estimation on a basis of the first type;
by a generating section, generating second data that is second-type device data the format of which differs from the format of the first-type device data, which is used for an execution of an estimation in the second model determined in the determining, on the basis of a first data; and by a second learning section, performing learning of the second model determined in the determining by using the second data,
wherein the generating section selects a part corresponding to the format of the second-type device data from the first data and thereby generates the second data.

5. A learning apparatus comprising:
an acquiring section configured to acquire first data that is first-type device data;
a first learning section configured to perform learning of a first model in which an estimation using the first-type device data is executed by using the first data;
a model determining section configured to determine a second model from among a plurality of models using different data formats each used for an execution of an estimation on a basis of the first type;
a generating section configured to generate second data that is second-type device data the format of which differs from the format of the first-type device data, which is used for an execution of an estimation in the second model determined by the model determining section, on a basis of the first data; and
a second learning section configured to perform learning of the second model determined by the model determining section by using the second data,
wherein the generating section selects a part corresponding to the format of the second-type device data from the first data and thereby generates the second data.

* * * * *